April 22, 1969    J. V. GRAHAM ET AL    3,439,783

BRAKE RELEASED MAGNETIC THROTTLE HOLDER

Filed June 14, 1967

INVENTORS:
JOHN V. GRAHAM
JOHN B. KEELING &
LEONARD L. ROBINETT
BY: *C. W. McGee*
    Atty.

United States Patent Office 3,439,783
Patented Apr. 22, 1969

3,439,783
BRAKE RELEASED MAGNETIC THROTTLE HOLDER
John V. Graham, 1201 N. 12th, and John B. Keeling, 507 West Ave. Q, both of Lovington, N. Mex. 88260, and Leonard L. Robinett, P.O. Box 1258, Maljamar, N. Mex. 88264
Filed June 14, 1967, Ser. No. 645,952
Int. Cl. F16d 67/00, 23/00; F02d 11/10
U.S. Cl. 192—3                  10 Claims

ABSTRACT OF THE DISCLOSURE

The throttle on an automobile is set at an adjustable opening by contacting an iron part on the control linkage to an electromagnet. The amount of opening is adjusted by rotating the control knob which has a threaded attachment to the iron member. The electric circuit to the electromagnet is broken by a manual switch or by the ignition switch or by a brake-actuated switch. In addition, the iron member may be manually displaced from the electromagnet.

BACKGROUND OF THE INVENTION

Field of the invention

This invention relates to automobiles and, more particularly, to a releasable throttle-holding device.

Description of the prior art

The general advantages of constant throttle devices have been recognized as improving the economy of the operation of the vehicle, as well as improving the comfort of the driver. Improving the comfort of the driver relieves him from strain and, therefore, contributes to increased alertness, thereby promoting safety. Also, these devices may be used to increase the idle speed of an automobile to warm up in cold weather. Customarily, the devices are released automatically when the brake pedal is depressed. A constant throttle device will also serve as a constant speed device on flat terrain. Many releasable throttle-holding devices for automobiles have been patented. However, none have gained widespread acceptance commercially. It appears that none have the desirable attributes of being inexpensive, fail-safe, and readily attachable and detachable from all models of automobiles.

SUMMARY

This invention solves the problem by providing an electromagnet which is readily attachable to the underside of the dash of an automobile. The control rod with a knob on the end extends through the electromagnet. A threaded arrangement provides for adjusting the amount of the throttle opening. A spring-loaded push button initially energizes the electromagnet and thereafter holding circuits continue to energize the electromagnet. The electromagnet is de-energized by the stop light circuit so that the electrical energy acts through a relay coil to open the circuit to the electromagnet.

Particular attention has been given so that any failure by burning out stop lights does not disable the system and failure of fuses or other failure in the electrical system will cause the electromagnet to disengage so that the throttle is closed. Also, particular care has been given so that it can be installed on all models of automobiles commonly on the market today, that it is simple to install, and it is readily removed from one car to be installed on another car in the event the owner "trades" cars. Also, effort has been made to design it so that it is attractive and does not detract from the interior decor of the automobile. Also, care has been exercised to make the device enconomical in its initial cost.

An object of this invention is to provide a device for holding the throttle of an automobile open an adjustable amount.

Other objects are to achieve the above with a device that is sturdy, compact, durable, simple, safe, versatile, and reliable, yet inexpensive and easy to manufacture, install, operate, and maintain.

Further objects are to achieve the above with a method that is rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
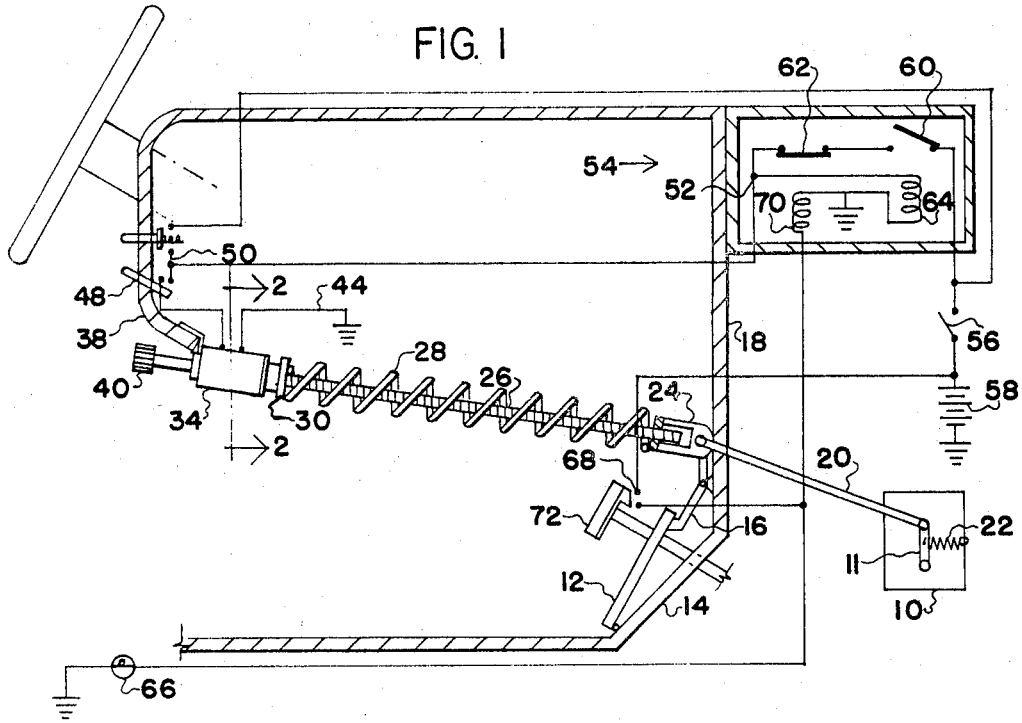
FIG. 1 is a schematic representation of an automobile equipped with the invention.
Figure 3:
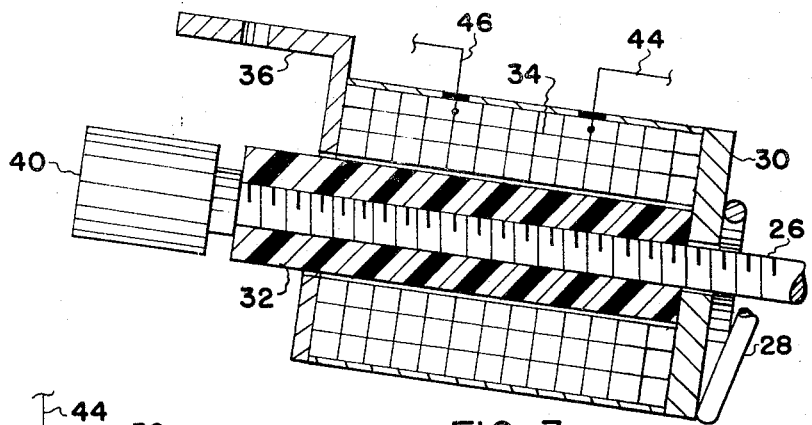
FIG. 3 is an axial section of the electromagnet taken on line 3—3 of FIG. 2.
Figure 2:
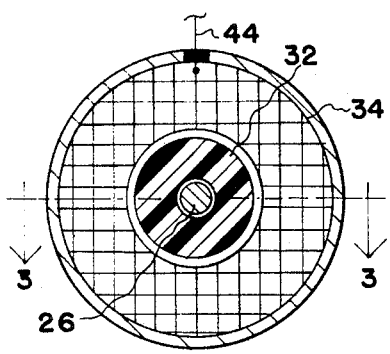
FIG. 2 is a cross section of the electromagnet taken on line 2—2 of FIG. 1.

FIG. 1 represents an automobile having carburetor 10 containing a throttle.

The throttle of the carburetor 10 is normally operated by accelerator pedal 12. The pedal 12 is pivoted to the floorboard 14 and actuates bell crank 16, the center of which is pivoted to a fire wall 18. Cable or tension link 20 connects the bell crank to throttle arm 11. The throttle is controlled by the position of throttle arm 11. Throttle spring 22 normally holds the throttle arm and thus the throttle in a closed position. The throttle spring 22 interconnects the throttle arm 11 and carbureor 10.

To attach the invention onto an automobile, U-shaped yoke 24 is attached to the bell crank 16 adjacent the point where the cable 20 is attached thereto. The bight of the yoke has a hole therethrough and control rod or tension member 26 is threaded through the hole. Thus, tension upon the rod 26 pulls the bell crank 16 to pull the cable 20 against pressure of spring 22, thus opening the throttle arm 11. The control rod 26 extends through iron magnetizable member 30. Compression spring 28 is telescoped around the control rod 26 between the yoke 24 and the member 30. Slide tube 32, of non-magnetic material, is telescoped within electromagnet 34. The electromagnet is attached by bracket 36 to the underside of dash 38. Knob 40 on the end of the control rod 26 is located below the dash and approximately even therewith.

The control rod 26 is telescoped through the slide tube 32, which forms a compression member between the member 30 and the knob 40. The electromagnet 34 engages the iron member 30 to provide good magnetic holding when the electromagnet is energized. When the member 30 is held to the electromagnet 34, rotation of the control rod 26 by the manual rotation of the knob 40 moves the yoke 24 in relationship to the iron member 30. It will be understood that the rod 26 is freely rotatable in the tube 32. Therefore, if the iron member 30 is engaged with the electromagnet 34, rotation of the knob 40 will adjust the opening of the throttle in the carburetor 10.

Connection 44 of the coil of the electromagnet 34 is electrically grounded. The other connection 46 is connected to manual switch 48. The other contact of the manual switch is connected to push button 50 and also to connection 52 within relay box 54. The other contact of the push button switch 50 is connected through ignition switch 56 to battery 58. The ignition switch is also connected to normally open relay switch 60. The other contact of normally open relay switch 60 is connected to normally closed relay switch 62. The other contact of the normally closed relay switch is connected to connection 52; all as shown in FIG. 1 of the drawing.

Electromagnetic relay coil 64, which is the operating coil for the normally open switch 60, is connected between connection 52 and ground. Stop light 66 is connected between ground and brake pedal switch 68. The brake pedal switch is connected to the battery 58. Electromagnetic relay coil 70, which is the operating coil for the normally closed relay switch 62, is connected between ground and stop light 66.

OPERATION

To hold the throttle arm 11 open, the ignition switch 56 must be closed and the manual switch 48 closed. Then, closing push button switch 50 temporarily will energize coil 64. The circuit energizing the relay coil 64 will be through the ignition switch 56, push button switch 50, connection 52, and coil 64. Once coil 64 is energized, it will close the switch 60 and then the coil 64 will remain energized by the circuit through ignition switch 56, switch 60, switch 62, connection 52, and coil 64. Once the connection 52 is energized, the electromagnet 34 is energized through the manual switch 48.

Once the electromagnet 34 is energized, the knob 40 may be pulled until the iron member 30 contacts electromagnet 34. Also, depression of the accelerator pedal 12 will cause the member 30 to contact the electromagnet 34 by the spring 28. When this contact occurs, the throttle arm 11 will be held open until it is released by any one of several methods. The amount of the adjustment by which the throttle arm 11 is held open will depend upon the distance from the iron member 30 to the yoke 24 which will be the distance from the iron member 30 to the cable 20. This distance may be adjusted by rotating the knob 40. Thus, it may be seen that the opening of the throttle arm 11 is adjusted by rotation of the knob 40. If it is desired to temporarily open the throttle wider, this is accomplished by temporarily depressing the accelerator pedal 12. The rod 26 and the knob 40 are free to move upward in the tube 32. Thus the tube acts as a lost motion linkage, i.e., the opening motion of the yoke 24 is "lost" to the member 30.

The throttle arm 11 may be closed in many ways. First, the knob 40 may be pushed in. This will manually disengage the iron member 30 from the face plate 42, permitting the spring 22 to close the throttle arm 11. The electromagnet 34 is insufficient to pull the iron member 30 to the electromagnet 34. The throttle arm 11 will remain controlled by the spring 22 until being reset by pulling the knob 40 or depressing pedal 12.

Second, the throttle arm 11 may be closed by manually opening the switch 48. Opening the switch 48 will disengage electromagnet 34 and spring 22 will overcome any residual magnetism between electromagnet 34 and iron member 30, closing throttle arm 11. It will be noted that the pushing of knob 40 and the opening of switch 48 are foolproof and that no sticking points in the electrical circuits or failure of fuses or any other electrical failure would prevent the closing of throttle arm 11 by the first or second method.

Third, the throttle arm may be closed by opening the ignition switch 56. The electromagnet 34 is energized only when the ignition switch 56 is closed. Therefore, opening ignition switch 56 will close throttle arm 11 regardless of any other electrical failures as described above. Also, opening the ignition switch 56 will de-energize connection 52 which will result in the opening of normally open switch 60 so that the automatic control element cannot again be energized without depressing the push button switch 50.

Fourth, the throttle arm 11 may be closed by operating brake pedal 72, thus closing brake pedal switch 68. Closing brake pedal switch 68 will complete the circuit from the battery 58 to the stop light 66. Therefore, if there is any failure in this circuit, it will be quickly detected because of the failure of the stop light 66. When the stop light 66 is energized, the relay coil 70 is also energized which opens switch 62. When switch 62 is opened, inasmuch as switch 50 is also open, the connection 52 will be de-energized, thus de-energizing both the electromagnet 34 and the holding coil 64. Thus, the throttle arm 11 will be closed and the automatic control can be energized again only by operation of push button 50.

Thus it may be seen there has been provided a simple, safe, fail-safe, automatic throttle control which is readily adaptable to be installed on any automobile.

It will be apparent that the embodiment shown is only exemplary and that various modifications can be made in operation, construction, materials, and arrangement within the scope of the invention as defined in the appended claims.

We claim as our invention:
1. In an automobile having
   (a) a dash,
   (b) a carburetor,
   (c) a throttle arm on the carburetor,
   (d) a tension link attached to the arm for opening the throttle arm, and
   (e) a spring biasing the throttle arm closed;
   (f) the improved structure for holding the throttle arm open comprising in combination with the above:
   (g) an electromagnet attached to the dash of the automobile,
   (h) a tension member attached to said tension link,
   (i) said tension member extending through said electromagnet,
   (j) a magnetizable member on the tension member,
   (k) said magnetizable member in contact with the electromagnet when the structure is holding the throttle arm open,
   (m) means for energizing and de-energizing said electromagnet.

2. The invention as defined in claim 1 with the additional limitation of
   (n) a lost motion linkage between the magnetizable member and the tension link.

3. The invention as defined in claim 2 with the additional limitation of
   (o) a threaded connection between the magnetizable member and the tension link whereby the distance from the magnetizable member and tension link may be adjusted.

4. The invention as defined in claim 1 with the additional limitation of
   (o) said means for energizing said electromagnet includes a holding coil which, when energized, will maintain the circuit energized until the circuit is opened.

5. The invention as defined in claim 1 with the additional limitation of
   (o) said means for de-energizing said electromagnet includes a normally closed switch and
   (p) an electromagnetic relay means for opening said normally closed switch.

6. The invention as defined in claim 5 with the additional limitations of
   (q) a stop light on the automobile,
   (r) a brake pedal on the automobile, and
   (s) means responsive to operation of the brake pedal for energizing the stop light and for energizing said electromagnetic relay means.

7. The invention as defined in claim 5 with the additional limitation of
   (q) said means for energizing said electromagnet includes a holding coil which, when energized, will maintain the circuit energized until the circuit is opened.

8. The invention as defined in claim 5 with the additional limitation of
   (q) a threaded connection between the magnetizable member and the tension link whereby the distance from the magnetizable member and tension link may be adjusted.

9. The invention as defined in claim 8 with the additional limitation of
   (r) said means for energizing said electromagnet includes a holding coil which, when energized, will maintain the circuit energized until the circuit is opened.

10. The invention as defined in claim 9 with the additional limitations of
   (s) a stop light on the automobile,
   (t) a brake pedal on the automobile, and
   (u) means responsive to operation of the brake pedal for energizing the stop light and for energizing said electromagnetic relay means.

References Cited

UNITED STATES PATENTS

| | | |
|---|---|---|
| 2,159,772 | 5/1939 | Schroedter _____ 74—513 X |
| 2,742,123 | 4/1956 | Exline. |
| 2,916,116 | 12/1959 | Eddy et al. |
| 2,954,705 | 10/1960 | Schillinger. |
| 3,100,021 | 8/1963 | Mavrer et al. |
| 3,204,734 | 12/1965 | McMaken. |

FOREIGN PATENTS 1,120,898   12/1961   Germany.

BENJAMIN W. WYCHE III, *Primary Examiner.*

U.S. Cl. X.R.

74—482; 123—102